Oct. 21, 1969 R. C. FERGASON 3,473,307
LUBRICATION DEFLECTOR FOR DRUM ASSEMBLY OF COTTON HARVESTER
Filed Sept. 1, 1967 3 Sheets-Sheet 1

Inventor
Rector C. Fergason
By Robert C. Sullivan
Attorney

Oct. 21, 1969 R. C. FERGASON 3,473,307
LUBRICATION DEFLECTOR FOR DRUM ASSEMBLY OF COTTON HARVESTER
Filed Sept. 1, 1967 3 Sheets-Sheet 3

Inventor
Rector C. Fergason
By Robert C. Sullivan
Attorney

United States Patent Office 3,473,307
Patented Oct. 21, 1969

3,473,307
LUBRICATION DEFLECTOR FOR DRUM ASSEMBLY OF COTTON HARVESTER
Rector C. Fergason, Gadsden, Ala., assignor to Allis-Chalmers Manufacturing Company, Milwaukee, Wis.
Filed Sept. 1, 1967, Ser. No. 665,043
Int. Cl. A01d 45/20, 69/12
U.S. Cl. 56—44         6 Claims

ABSTRACT OF THE DISCLOSURE

An annular oil deflector member is positioned beneath each spindle drive gear assembly in the drum of a drum type cotton harvester to deflect oil from the inner surface of the drum, where it has been thrown by the spindle drive gears, onto the next lower spindle drive gear assembly.

---

The present invention relates to drum type cotton harvesters and more particularly to improvements in lubrication deflectors used with the drum assemblies of such harvesters.

In the conventional drum type cotton harvester, the picking mechanism is composed of any upright picking drum which is rotatably driven about a centrally located vertical shaft. This center shaft mounts a series of double bevel gears each of which engages and drives two horizontal rows of picking spindles. The spindles project laterally from the drum with each individual spindle being driven about its respective axis.

The actual picking operation upon the cotton takes place externally of the drum which completely houses the many gears necessary for the transmission of rotation to the drum and spindles. This arrangement protects the gearing against the entry of dirt, trash and other foreign matter, and also permits the use of a recirculating lubrication system which constantly and thoroughly lubricates all the gears and bearings in the drum.

Experience has shown that the lubricant entering the upper portion of the picking unit will be centrifugally thrown outwardly against the sides of the drum by the rotating spindle drive gears. The oil will then run down the sides of the drum and fail to adequately lubricate all the gears and bearings.

The present invention provides a series of vertically spaced baffles or oil deflectors which are positioned between successive spindle drive gears to divert the oil running down the sides of the drum back onto the successively lower gears. In this manner the lubricant takes a labyrinth course down the length of the drum to thoroughly lubricate all of the rotating parts therein.

Accordingly, it is an object of the invention to provide the combination with a drum type cotton picker an oil deflector arrangement which insures thorough lubrication of all of the rotating parts within the drum.

It is another object of this invention to provide in combination with a drum type cotton picker, an oil deflector which deflects oil centrifugally thrown against the internal sides of the drum by the spindle drive gears back onto the next lower gear assembly.

Further features of the invention will become obvious from the following description taken in conjunction with the accompanying drawings in which.

Figure 1:
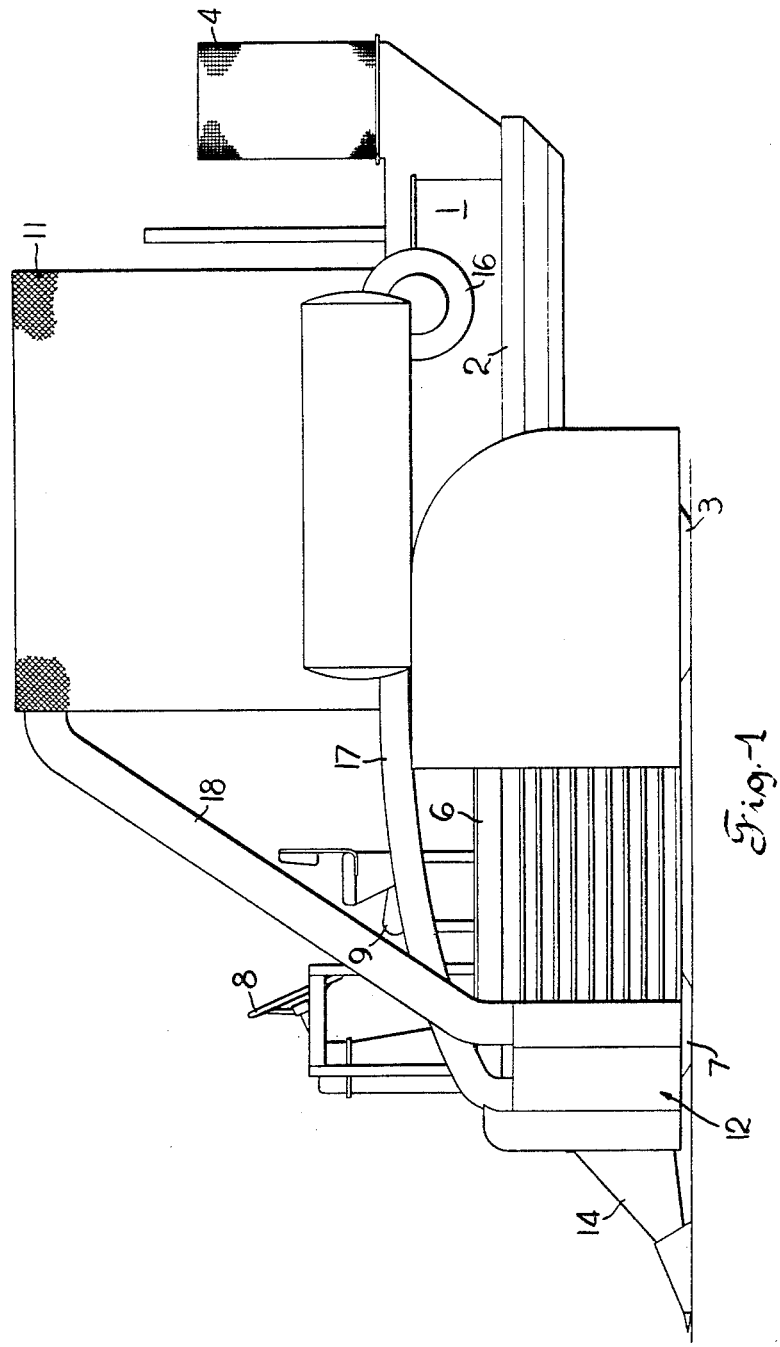
FIG. 1 is a side elevation of a cotton harvester embodying the invention.

Referring now to FIG. 1, the cotton harvester embodying the invention consists generally of an engine 1 joined to a axle housing (not shown) and supported thereby as a cantilever beam. A frame member 2 supports engine 1 from the axis housing. A pair of laterally spaced traction wheels 3 (only one is shown) are operatively connected to opposite ends of the axle housing in a conventional manner. Engine 1 is provided with an air intake cleaning screen 4 which is carried by the engine. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried by frame 6 rearwardly of the steering wheel 8. A picked cotton receiving basket 11 is carried on frame members 6 and 2 rearwardly of operator's seat 9. Cotton picker assemblies 12 are mounted on each side of the forward end of frame 6. These assemblies are carried by a subframe 13 (see FIG. 2) which is adjustably connected to frame 6 for vertical movement relative thereto. The forward end of assemblies 12 (see FIG. 1) is provided with plant dividers 14 which guide cotton plants into contact with cotton pickers which are positioned just rearwardly of the plant dividers. If further details of the stalk dividers are desired, reference may be had to U.S. patent application Ser. No. 456,399, now Patent 3,380,233, filed May 17, 1965 for Plant Divider for Harvesters. Frame 2 supports a blower 16 which is provided with a duct 17 which delivers pressurized air to picking assembly 12 and a cotton delivering duct 18 for depositing picked cotton into basket 11.

Figure 2:
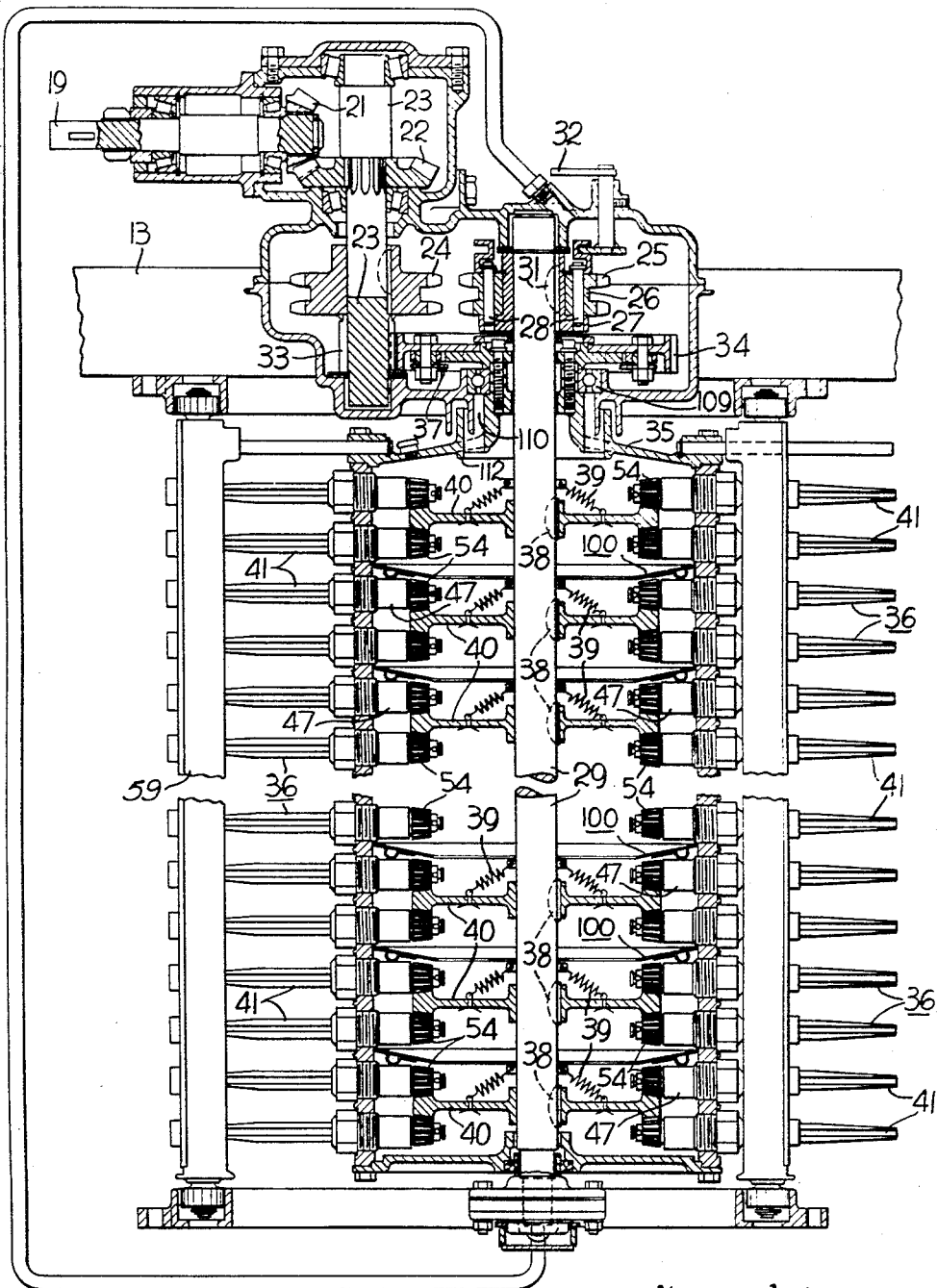
FIG. 2 is a cross sectional view of a drum type cotton harvester embodying the invention, showing the power train for driving the drum and picking spindles and showing a vertical row of cotton picking spindles on the right in picking position, and on the left in stripped position.

Engine 1 is provided with a power takeoff shaft (not shown) which is operatively connected to shaft 19 of picking unit 12 (see FIG. 2). A gear 21 is attached to shaft 19 for rotation therewith and gear 21 is drivingly engaged with gear 22 attached to shaft 23. A double sprocket 24 attached to shaft 23 is drivingly connected to double sprocket 25 by means of chains (not shown). Double sprocket 25 includes a center portion 27 upon which the outer portion 26 is journaled. These two portions 26 and 27 are selectively joined together by means of pins 28. Center portion 27 is keyed to shaft 29 for rotation therewith by conventional means such as half moon key 31. Pins 28 can be raised vertically by raising handle 32 and the mechanism connected therewith to interrupt the driving connection between portions 26 and 27.

Beneath sprocket 24 a gear 33 is attached to shaft 23. Gear 33 is drivingly engaged with a gear 34 which surrounds shaft 29 and which rotates relative thereto and gear 34 is attached to drum 35 for rotation therewith. A ratchet mechanism 37 is interposed between drum 35 and gear 34 so that drum 35 can only be driven in one direction. If driven in the opposite direction, the ratchet mechanism interrupts the drive.

Reference numeral 35 designates the drum or cylinder of a cotton picking machine and which drum carries a plurality of cotton picking assemblies 36. Each picking assembly 36 includes a picking spindle 41. Pairs of horizontal rows of spindles 41 are driven by a double bevel gear 40 secured to drive shaft 29 by means of key 38, the radially inner end of each spindle being provided with a beveled pinion gear 54 which mates with gear 40. Springs 39 suspended gears 40 from shaft 29 and half-moon keys 38 permit gears 40 to be self-aligning. By not having the weight of the gears supported on the lower of the pair of spindles, backlash problems in the gears are eliminated.

The spindle assembly 36 (see FIG. 2) includes a picking spindle 41 having an inner shank portion and a tapered picker portion. A tubular support 47 is assembled on the spindle shank portion. Beveled pinion gear 54 is positioned on the after end of spindle 41 and drives the spindle by means of a frangible roll pin with such roll pin being received in aligned openings in the spindle and gear. The outer surface of tubular support 47 is threaded so that spindle assemblies 36 can be securely received by corresponding threaded openings in the drum 35. Oil for lubrication of the gears and bearings is furnished by pump 55 (see FIG. 2) which pumps oil to the upper portion of the drum, thereafter permitting same to return to the pump by action of gravity. Pump 55 is operatively connected to the lower end of shaft 29 for rotation therewith.

A stripper bar or slat 59 (FIG. 2) is associated with each vertical row of spindles on the drum 35 and is supported from the drum by means of radial rods 50 upon which the slats 59 are slidably mounted. A pair of vertically spaced stationary cam tracks 61 carried by means of frame 13 at the upper end and by means (not shown) at the lower end are arranged to receive rollers 62 carried by the stripper bars and to cause movement of the stripper bar longitudinally of the spindles during rotation of the drum.

For further details of the spindle assembly and of the stripper mechanism with which it cooperates, reference is made to U.S. patent application Ser. No. 656,811 filed July 28, 1967 for a Cotton Harvester.

Figures 3, 4:
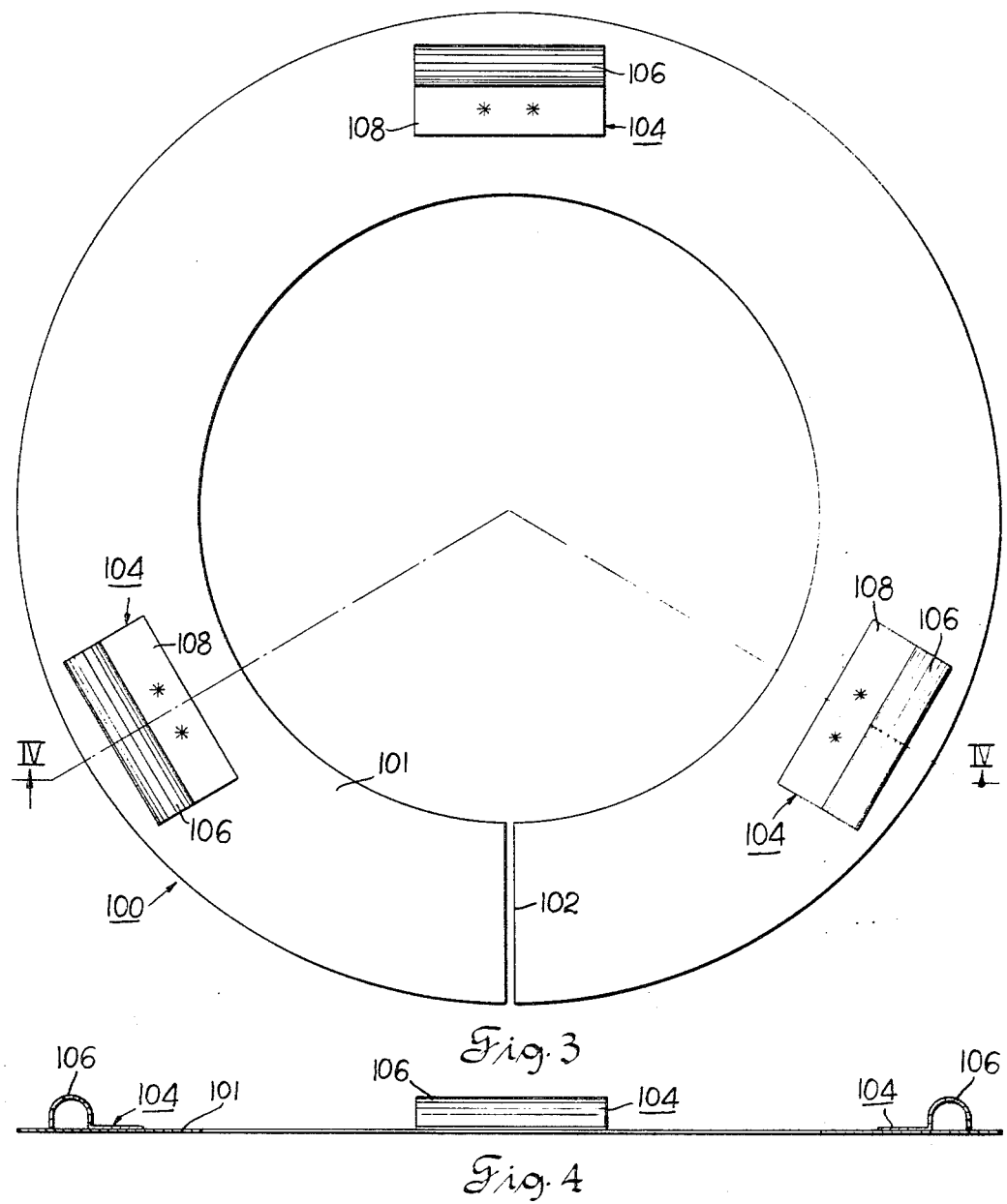
FIG. 3 is a bottom plan view of one of the oil deflector members.
FIG. 4 is a view in cross section taken along line IV—IV of FIG. 3.

In accordance with the invention, as best seen in FIGS. 2, 3, and 4, there is provided an oil deflector shield generally indicated at 100 which, in the illustrated embodiment, is formed of an annular-shaped band 101 of sheet metal or the like having an outer diameter which is somewhat greater than the inner diameter of drum 35. Shield 100 is split as indicated at 102. The under surface of shield 100 is provided with three equally circumferentially spaced spacer members 104 each including a spacer portion 106 of generally U-shape in cross section and a flat flange portion 108 which is welded or otherwise rigidly attached to the under surface of annular shield member 100.

A series of the deflector shields 100 are mounted inside drum 35, one such shield being positioned beneath the lower horizontal row of bevel pinion gears 54 associated with each double bevel gear 40. The three spacer members 104 on the under surface of each deflector shield 100 rest on the upper surface of three circumferentially spaced tubular supports 47 of the next lower row of bevel pinion gears and thereby maintain each shield 100 raised sufficiently so that it is out of contact with the rotating bevel pinion gears 54.

Since the outer diameter of shield 100 is made somewhat greater than the inner diameter of drum 35 the deflector shield must be dished or concaved slightly in order to be received within the drum, which is permitted by the presence of split 102 in shield 100, this dishing or concaving providing a radially inward slope which directs the deflected oil in a radially inward direction. The diameter of the central opening of the deflector shield 100 is such that the radially inner edge of the band 101 lies inwardly of the radially inner end of the bevel pinion gears 54, whereby oil collected by shield 100 passes downwardly onto the upper surface of the double bevel gear 40, from whence the oil passes into contact with the meshing surfaces of pinion gears 54 and double bevel gear 40.

The oil from pump 55 lubricates the gear box and passes downwardly by gravity through bearing 109 and openings 110 in the drum cover (FIG. 2). The openings 110 are provided with a drip edge 112 so that the oil will drip down onto the surface of the uppermost double bevel gear 40 instead of running down the cover and sides of the drum.

It will be apparent that oil thrown outwardly onto the drum wall by the successive spindle drive gears will be collected by the deflectors 100 lying below the respective gears, and will be directed by the deflectors back onto the respective next lower set of double bevel and pinion gears. The use of the series of deflectors as previously described insures that all gears and bearing surfaces in the drum are adequately lubricated.

It is obvious from the foregoing description and drawings that the detailed arrangement and construction of the various elements may be modified considerably without departing from the spirit of the invention which must not be considered as limited strictly to the construction shown and described.

The embodiments of the invention in which an exclusive property or privilege is claimed are defined as follows:

1. In a cotton picker, a picking cylinder, means for revolving the cylinder on a vertical axis, a plurality of picking spindles radiating horizontally from said cylinder at a plurality of vertically spaced levels, gear means for rotating said spindles about their longitudinal axes, said gear means being positioned at a plurality of spaced vertical levels in geared relation with said picking spindles, means for circulating lubricant through said cylinder, and lubricant deflector means positioned in said cylinder between gear means which are located at at least two successive vertical levels where by to direct lubricant discharged from gear means at one level onto gear means at a lower level.

2. In a cotton picker as defined in claim 1 and wherein said gear means are so located in said cylinder as to tend to throw lubricant onto the inner wall surface of said cylinder, and said lubricant deflector means is so positioned as to direct lubricant radially inwardly away from said wall surface and into contact with gear means below said deflector means.

3. In a cotton picker as defined in claim 1 and wherein a plurality of lubricant deflector means are positioned at a plurality of vertical levels in said cylinder.

4. In a cotton picker as defined in claim 1 including a rotatably driven vertical shaft positioned in said cylinder, a plurality of first gear means mounted on said shaft in vertically spaced relation to each other, second gear means carried by the respective picking spindles, said first and second gear means being in geared engagement with each other whereby to rotatably drive said spindles, and lubricant deflector means positioned between successive vertically spaced first gear means.

5. In a cotton picker as defined in claim 1 and wherein said lubricant deflector means is an annular band-like member which is concaved radially inwardly and downwardly, whereby to direct lubricant from the inside wall surface of said cylinder toward a gear means disposed beneath said deflector means.

6. In a cotton picker as defined in claim 1 including spacer means on said lubricant deflector means, gear support means projecting into said cylinder, said spacer means seating on said gear support means whereby to maintain said lubricant deflector means out of contact with a rotating gear means therebelow.

References Cited

UNITED STATES PATENTS

| | | | |
|---|---|---|---|
| 1,635,161 | 7/1927 | Berry | 56—44 |
| 1,747,566 | 2/1930 | Berry | 56—14 |
| 1,926,337 | 9/1933 | Johnston | 56—44 |
| 2,593,671 | 4/1952 | Hagen et al. | 56—41 |

RUSSELL R. KINSEY, Primary Examiner